(12) United States Patent
Slobodecki et al.

(10) Patent No.: US 7,871,102 B2
(45) Date of Patent: Jan. 18, 2011

(54) AIR BAG FASTENER ASSEMBLY

(75) Inventors: Jeffrey A. Slobodecki, Wales, MI (US); Robert E. Lord, Jr., Chesterfield, MI (US); Joshua J. Giddings, Chesterfield, MI (US); Thomas J. Lerch, Shelby Township, MI (US)

(73) Assignee: Newfrey LLC, Newark, DE (US)

( * ) Notice: Subject to any disclaimer, the term of this patent is extended or adjusted under 35 U.S.C. 154(b) by 212 days.

(21) Appl. No.: 12/211,558

(22) Filed: Sep. 16, 2008

(65) Prior Publication Data

US 2010/0066061 A1 Mar. 18, 2010

(51) Int. Cl.
*B60R 21/20* (2006.01)

(52) U.S. Cl. ..................... 280/728.2; 24/663

(58) Field of Classification Search ............ 24/663; 280/728.2; 411/15, 349; 470/2–7
See application file for complete search history.

(56) References Cited

U.S. PATENT DOCUMENTS

| | | | | |
|---|---|---|---|---|
| 2,200,702 A * | 5/1940 | Albert | | 411/349 |
| 2,404,169 A * | 7/1946 | Gidden | | 411/340 |
| 2,620,539 A * | 12/1952 | Jules | | 411/349 |
| 3,292,479 A * | 12/1966 | Tinnerman et al. | | 24/581.1 |
| 3,486,158 A * | 12/1969 | Soltysik et al. | | 439/92 |
| D274,691 S * | 7/1984 | Wallace | | D8/336 |
| 5,368,427 A * | 11/1994 | Pfaffinger | | 411/553 |
| 5,603,524 A * | 2/1997 | Barnes et al. | | 280/728.2 |
| 6,431,585 B1 * | 8/2002 | Rickabus et al. | | 280/728.3 |
| 6,540,251 B1 * | 4/2003 | LeVey et al. | | 280/728.2 |
| 6,705,635 B2 * | 3/2004 | Hoeft et al. | | 280/728.2 |
| 6,824,197 B2 * | 11/2004 | Benedetti | | 296/146.15 |
| 6,851,702 B2 * | 2/2005 | Henderson et al. | | 280/728.2 |
| 6,857,168 B2 * | 2/2005 | Lubera et al. | | 24/293 |
| 6,976,292 B2 * | 12/2005 | MacPherson et al. | | 24/293 |
| 7,168,138 B2 * | 1/2007 | Lubera et al. | | 24/295 |
| 7,179,038 B2 * | 2/2007 | Reindl | | 411/433 |
| 7,204,000 B2 * | 4/2007 | Benedetti et al. | | 24/295 |
| 7,213,304 B2 * | 5/2007 | Lubera et al. | | 24/295 |
| 7,287,945 B2 * | 10/2007 | Lubera et al. | | 411/508 |
| 7,318,256 B2 * | 1/2008 | Lubera et al. | | 24/295 |
| 7,320,157 B2 * | 1/2008 | Lubera et al. | | 24/295 |
| 7,338,068 B2 * | 3/2008 | Kawai et al. | | 280/728.2 |
| 7,399,151 B2 * | 7/2008 | Lubera et al. | | 411/522 |
| 7,419,206 B2 * | 9/2008 | Slobodecki et al. | | 296/97.9 |
| 7,725,991 B2 * | 6/2010 | Lubera et al. | | 24/295 |
| 2007/0296184 A1 * | 12/2007 | Oestergren | | 280/728.2 |
| 2008/0014045 A1 * | 1/2008 | Kawai | | 411/45 |
| 2010/0072735 A1 * | 3/2010 | Kirchen et al. | | 280/728.2 |

* cited by examiner

*Primary Examiner*—Paul N Dickson
*Assistant Examiner*—Laura Freedman
(74) *Attorney, Agent, or Firm*—Harness, Dickey & Pierce, P.L.C.

(57) ABSTRACT

A fastener assembly includes a metal first component having two flange portions defining a receiving slot therebetween, and a polymeric component received in the receiving slot in an assembled position. When rotated 90 degrees the second component outwardly displaces first and second deflectable wings of the first component to extended positions.

20 Claims, 10 Drawing Sheets

AIR BAG FASTENER ASSEMBLY

FIELD

The present disclosure relates to a fastener assembly for joining automobile vehicle component parts including air bags to body panels.

BACKGROUND

This section provides background information related to the present disclosure which is not necessarily prior art.

For automotive applications, fasteners are used to join components such as air bag assemblies to sections or metal body portions of the automobile. The requirements for these fasteners are that they be insertable into apertures of the automobile and meet requirements to both retain the air bag as well as provide a minimum pullout retention force to withstand the force of a deploying air bag. In the event that an air bag has deployed which requires replacement of the air bag and/or the trim piece supporting the air bag, the fasteners also need to be removable. Common fastener designs include directly opposed flexible wings which deflect inwardly upon insertion of the fastener and expand by spring force to hold the fastener within a rectangular slot in the automobile. Other fastener designs provide threaded connectors that must be rotated into position and torqued to a predetermined torque value to validate a correct installation. These designs often require a first fastener component be installed at a first installation station and a fastener that is installed and torqued at a second or later station.

Several drawbacks of commonly used fasteners are the time required to install the fastener, and the potential for improperly torquing the fastener. Further drawbacks of existing designs include maintaining separate part inventories such as screws, malfunction problems between screws and metal, installation labor required, a driver tool over-powering the metal/screw, high tooling costs, and improper fit-up causing loose components.

SUMMARY

This section provides a general summary of the disclosure, and is not a comprehensive disclosure of its full scope or all of its features.

According to several embodiments of the present invention, a fastener assembly includes a first component having opposed first and second legs defining a cavity therebetween, and first and second deflectable wings each homogenously connected to and freely extending from one of the first and second legs. The first deflectable wing extends oppositely with respect to the second deflectable wing. A second component has an engagement member adapted to be slidably received in the cavity of the first component. A mounting flange has the engagement member homogenously connected thereto. The mounting flange extends substantially transverse to the engagement member. An assembled position of the first and second components has the engagement member slidably disposed within the cavity. An extended position of the first and second components has the second component rotated approximately 90 degrees from the assembled position wherein the engagement member displaces both the first and second deflectable wings away from each other.

According to other embodiments, a fastener assembly includes a metal first component having two homogenously connected flange portions separated from each other defining an engagement member receiving slot therebetween. The flange portions each have one of a first and a second leg separated from each other defining a cavity therebetween. A first arm is oriented transverse to the first leg and has a first deflectable wing extending freely from the first arm. A second arm oriented transverse to the second leg has a second deflectable wing extending freely from the second arm. A polymeric second component includes an engagement member adapted to be received in the cavity of the first component without contacting the first or second deflectable wings, defining an assembled position of the first and second components. A mounting flange has the engagement member homogenously connected thereto. The mounting flange extends substantially transverse to the engagement member and parallel to the first and second legs. An extended position of the first and second components has the second component rotated approximately 90 degrees from the assembled position. The engagement member operates in the extended position to displace both the first and second deflectable wings away from each other.

According to further embodiments, a fastener assembly adapted to connect an air bag to a vehicle panel includes a first component having a support wall connected to first and second coplanar flange portions. A fixed arm extends parallel to the support wall from one of the flange portions. Opposed first and second legs define a cavity therebetween. The first leg is connected to the support wall and the second leg is connected to the fixed arm. First and second deflectable wings are each homogenously connected to and freely extend from one of the first and second legs. A second component has an engagement member adapted to be slidably received in the cavity of the first component. A mounting flange has the engagement member homogenously connected thereto. The mounting flange extends substantially transverse to the engagement member. The support wall, the fixed arm, the first and second legs, and the first and second deflectable wings define an insertion portion adapted to be slidably received in both an aperture of an air bag and an aperture of a vehicle panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
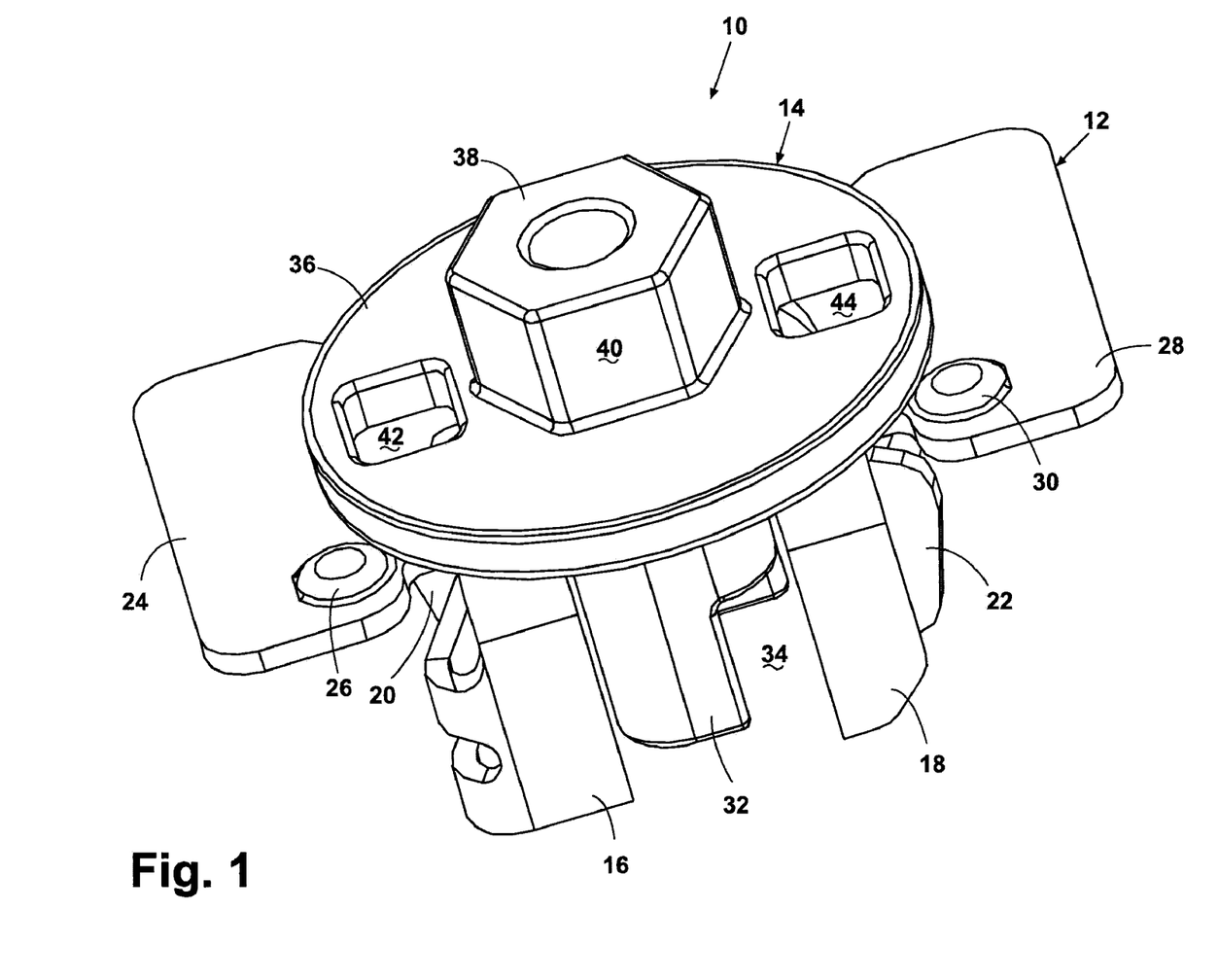
FIG. 1 is a top perspective view of a fastener assembly having a first component and second component received by the second component.

Referring to FIG. 1, a fastener assembly 10 of the present disclosure includes a first component 12 which matingly receives a second component 14 which when rotated within the first component 12 deflects elements of the first component and creates a completed locked assembly. According to several embodiments, first component 12 can be a metal such as a carbon steel shaped by multiple operations such as bending, punching, stamping, and/or cutting. Second component 14 can be made from a polymeric material such as polyoxymethylene, and can be formed for example using an injection molding process.

First component 12 includes a first leg 16 spatially separated from a second leg 18. A first deflectable wing 20 is homogenously connected to first leg 16. Similarly, but oppositely directed, a second deflectable wing 22 is homogenously connected to a contact support wall 50 shown and described in reference to FIG. 2. A first flange portion 24 extends transversely from first leg 16, and includes a first raised detent 26. Similarly, a second flange portion 28 extends transversely from second leg 18 and includes a second raised detent 30. First and second raised detents 26, 30 can be formed for example by a dimpling operation performed when first and second flange portions 24, 28 are cut or stamped.

Second component 14 provides an engagement member 32 which is slidingly received in a cavity 34 created between first and second legs 16, 18 of first component 12. Second component 14 further includes a mounting flange 36 which according to several embodiments is created in a substantially circular shape, but the shape of the mounting flange 36 can also vary from circular to other geometric shapes such as but not limited to oval, square, rectangular, and the like. A drive member 38 is homogenously connected to mounting flange 36 and extends transversely with respect to mounting flange 36. Drive member 38 includes a plurality of tool drive faces 40 adapted to receive a tool such as a socket or wrench for rotation of second component 14 with respect to first component 12. A first and a second flange port 42, 44 are oppositely positioned about drive member 38. The function of first and second flange ports 42, 44 will be described in reference to FIG. 19.

Figure 2:
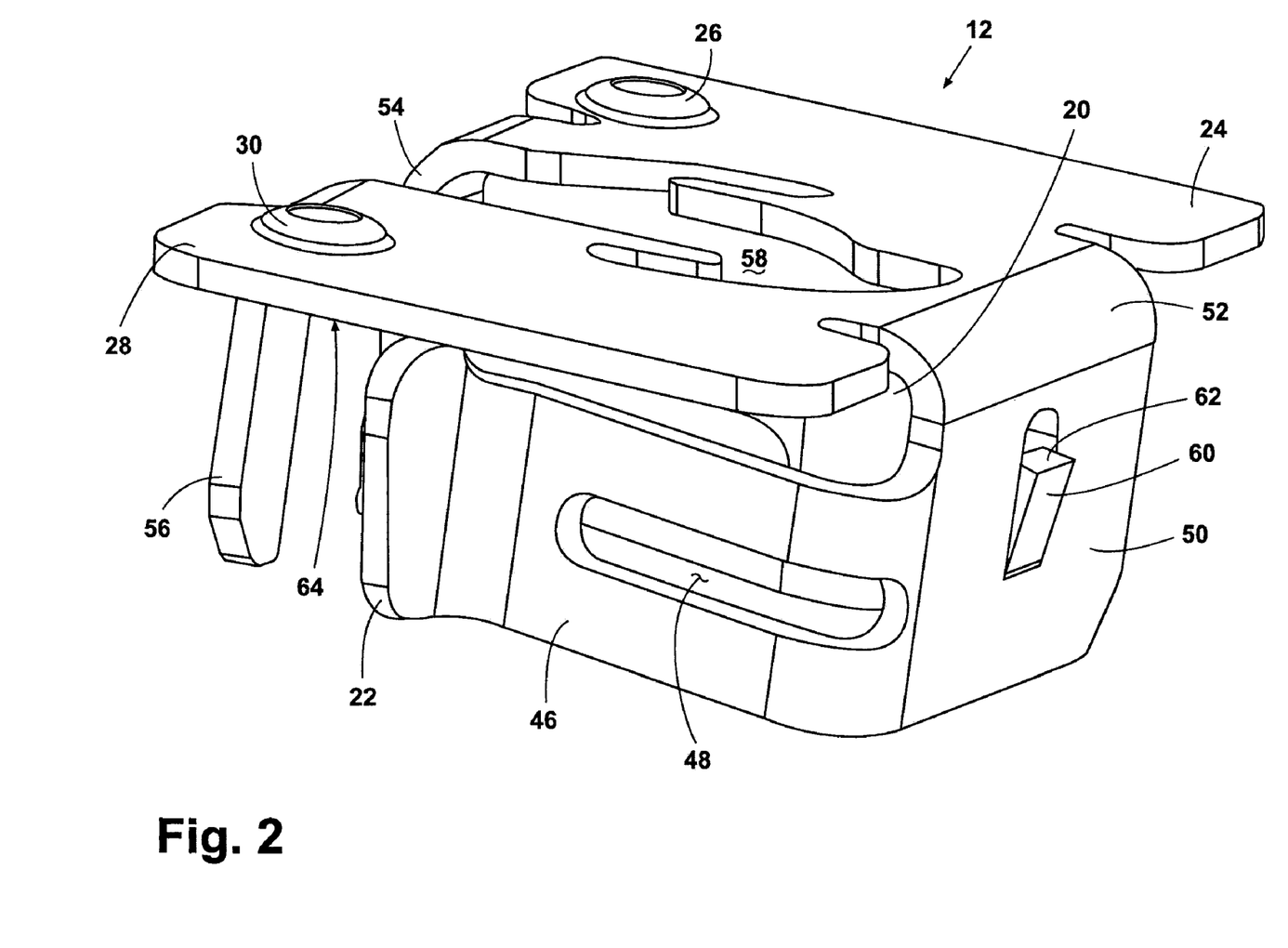
FIG. 2 is a side elevational perspective view of the first component of FIG. 1.

Referring to FIG. 2, first component 12 further includes a first flexible arm 46 which can include an elongated slot 48 adapted to change the deflection properties of first flexible arm 46 and therefore the spring force of second deflectable wing 22 based on a width and length of elongated slot 48. First flexible arm 46 is homogenously connected to support wall 50 and can be formed for example by bending first flexible are 46 at its junction with support wall 50. Support wall 50 is homogenously connected to both first and second flange portions 24, 28 by a joining portion 52 which in the exemplary embodiment shown in FIG. 2 defines a bend section.

A first fixed arm 54 is oriented substantially transverse to first flange portion 24. Similarly, a second fixed arm 56 is oriented substantially transverse to second flange portion 28. First and second fixed arms 54, 56 are each homogenous extensions of first and second flange portions 24, 28 respectively. First fixed arm 54 provides for connection of first deflectable wing 20 (not shown in this view) to first component 12. An engagement member receiving slot 58 is defined between first and second flange portions 24, 28. A tab 60 extends homogenously from support wall 50 and creates a tab surface 62 which faces a contact face or lower face of both first and second flange portions 24, 28. The purpose for tab 60 and tab surface 62 will be described in reference to FIG. 15. Tab 60 is extends oppositely to first and second fixed arms 54, 56.

Figure 3:
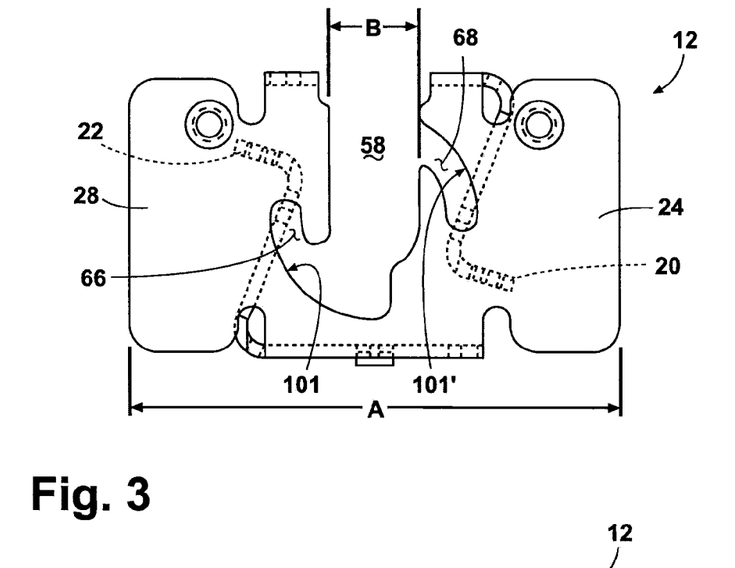
FIG. 3 is a top plan view of the first component of FIG. 2.

Referring to FIG. 3, a first arc-shaped slot 66 extends partially into second flange portion 28 from engagement member receiving slot 58. Similarly, but oppositely directed, a second arc-shaped slot 68 extends partially into first flange portion 24 opening into engagement member receiving slot 58. A flange contact width "A" is provided by the opposed ends of first and second flange portions 24, 28. A slot with "B" is defined for engagement member receiving slot 58. The oppositely directed orientation of first deflectable wing 20 and second deflectable wing 22 is evident in FIG. 3.

Figure 4:
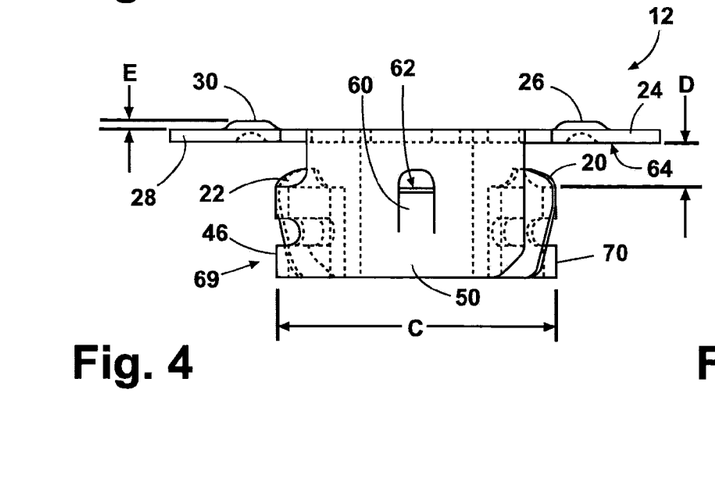
FIG. 4 is a front elevational view of the first component of FIG. 2.
Figure 5:
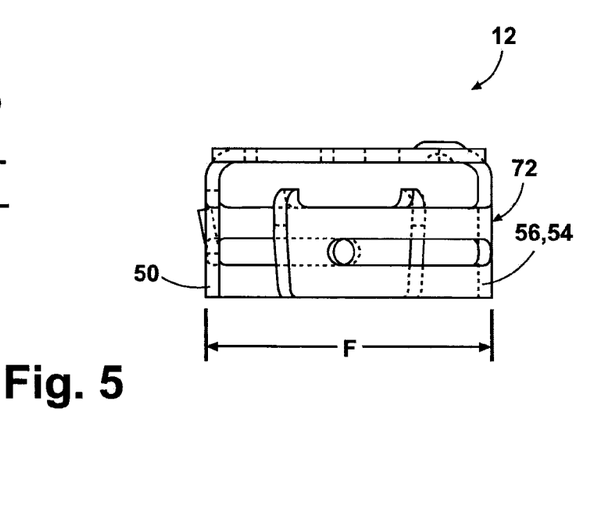
FIG. 5 is an end elevational view of the first component of FIG. 2.

Referring to FIGS. 4 and 5, an insertion portion 69 is defined by the combination of first and second deflectable wings 20, 22, first and a second flexible arm 46, 70, support wall 50, and tab 60. An insertion portion width "C" is defined between outer surfaces of first flexible arm 46 and second flexible arm 70. First deflectable wing 20 is homogenously connected by second flexible arm 70 to support wall 50. It is desirable that first and second deflectable wings 20, 22 in their non-deflected condition as shown in FIG. 4 be positioned within or extend no further outward than opposed planes defining insertion portion width "C" established by outward facing surfaces of first flexible arm 46 and second flexible arm 70. A spacing dimension "D" is defined between tab surface 62 of tab 60 and contact face 64. Each of first and second raised detents 26, 30 extend above first and second flange portions 24, 28 by a detent height "E". According to several embodiments, detent height "E" is less than one millimeter. Referring specifically to FIG. 5, an insertion portion length "F" is defined between outer facing surfaces of support wall 50 and a fixed arm outward face 72 defined for each of first and second fixed arms 54, 56.

Figure 6:
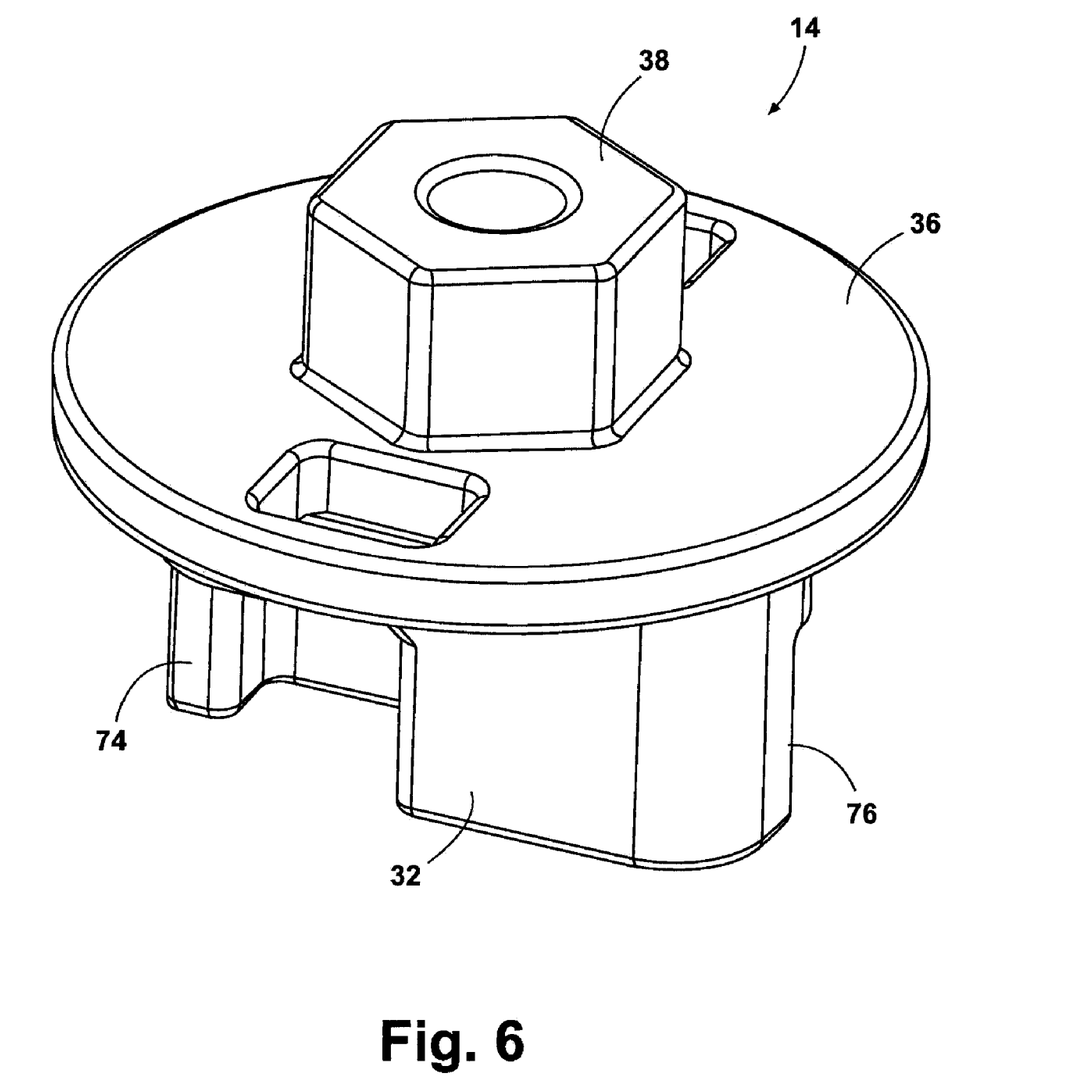
FIG. 6 is a top perspective view of the second component of FIG. 1.

Referring to FIG. 6, engagement member 32 extends from mounting flange 36 and is directed opposite with respect to drive member 38. A first engagement wall 74 is provided at a first end of engagement member 32. Similarly, a second engagement wall 76 is provided at an opposite end of engagement member 32. First and second engagement walls 74, 76 can be oppositely directed with respect to each other.

Referring to FIG. 7 and again to FIG. 1, second component 14 further includes a neck region 78 which homogenously connects engagement member 32 to mounting flange 36.

Figure 7:
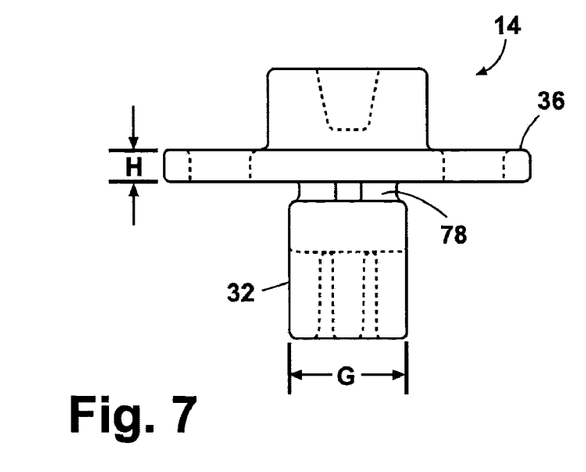
FIG. 7 is a front elevational view of the second component of FIG. 6.

Neck region 78 has a width which is smaller than an engagement member width "G" of engagement member 32, which according to several embodiments is approximately 5.8 mm. Neck region 78 is adapted to be slidably received within engagement member receiving slot 58 of first component 12, having mounting flange 36 positioned on a first side of first and second flange portions 24, 28 and engagement member 32 positioned on an opposite side of first and second flange portions 24, 28. Mounting Flange 36 has a mounting flange thickness "H". Mounting flange thickness "H" according to several embodiments is approximately 1.2 mm which is selected to stiffen mounting flange 36 for engagement with first and second flange portions 24, 26 of first component 12 when second component 14 is received within first component 12.

Referring to FIG. 8 and again to FIG. 1, second component 14 further includes a first pin 80 and a second pin 81 which are homogenously connected at opposite ends to a lower surface 82 of mounting flange 36 and to an upper surface 83 of engagement member 32. First pin 80 is oppositely positioned about neck region 78 from second pin 81. A length of first and second pins 80, 81 is substantially equal to or greater than a thickness of first and second flange portions 24, 26 so that portions of first and second flange portions 24, 26 can slidably fit between lower surface 82 and upper surface 83 when first component 12 is connected to second component 14. An engagement member height "J" is defined for engagement member 32 that is selected to extend engagement member 32 vertically throughout cavity 34.

Figure 8:
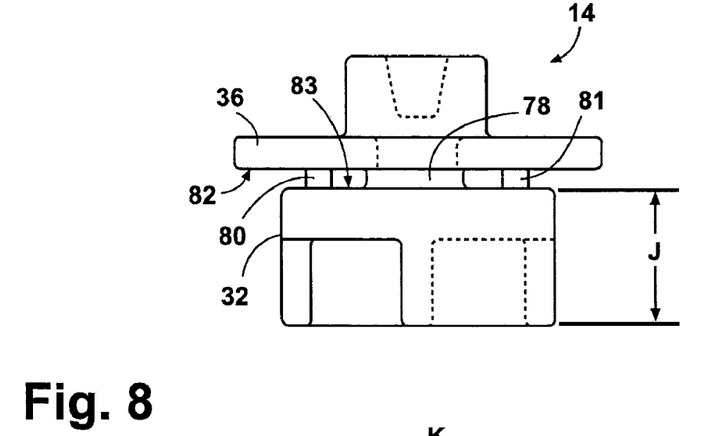
FIG. 8 is an end elevational view of the second component of FIG. 6.

Referring to FIG. 9 and again to FIG. 8, according to several embodiments, mounting flange 36 is circular in shape and has a mounting flange diameter "K" of approximately 18.0 mm. Engagement member 32 defines a substantially rectangular shape having first and second engagement walls 74, 76 extending freely away from a base portion 84. A radius corner 85, 85', 85', 85'" is provided at each of the outside corners of base portion 84 and radius corners 85, 85" further extend throughout height "J" of each of first and second engagement walls 74, 76. First and second pins 80, 81 are positioned proximate to first and second engagement walls 74, 76 respectively.

Figure 10:
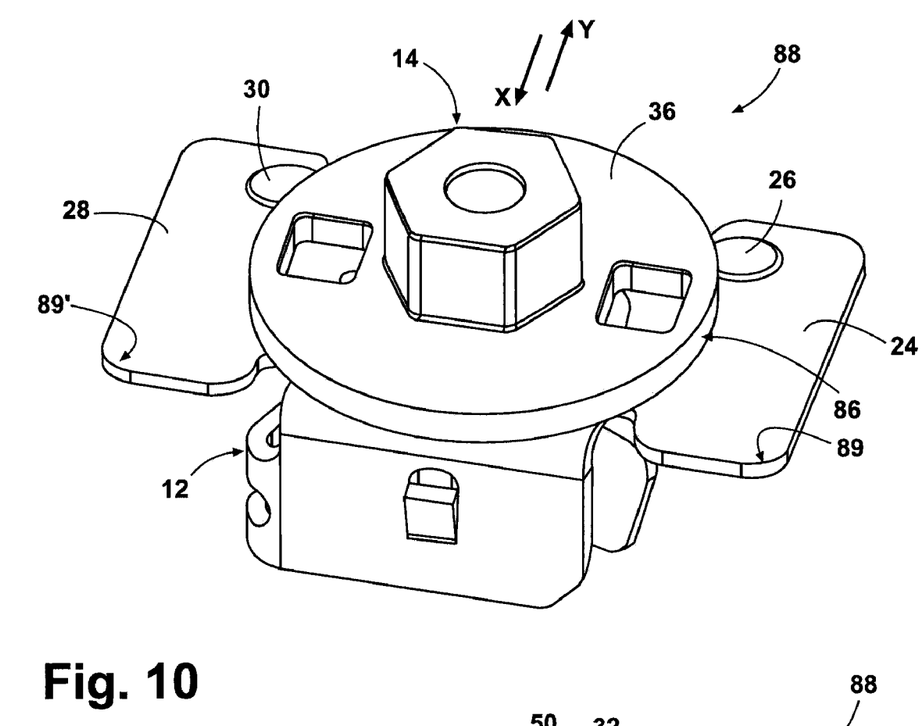
FIG. 10 is a rear perspective view of the fastener assembly of FIG. 1.

Referring to FIG. 10, second component 14 is engaged with first component 12 by sliding second component 14 in an insertion direction "X". Second component 14 is moved in the insertion direction "X" until the mounting flange 36 pressing downwardly (as viewed toward the bottom of FIG. 10) on first and second raised detents 26, 30 deflects first and second flange portions 24, 28 away from mounting flange 36 until mounting flange 36 slides past each of first and second raised detents 26, 30 and a bias force returns first and second flange portions 24, 28 so that mounting flange 36 contacts directly on upper facing surfaces 89, 89' of first and second flange portions 24, 28. Limited deflection of mounting flange 36 (away from first and second flange portions 24, 28) can also occur during the assembly. After this "assembled position" of first and second components 12, 14 is established, contact between a mounting flange perimeter wall 86 of mounting flange 36 and first and second raised detents 26, 30 acts to resist withdrawal of second component 14 in a release direction "Y". Raised detents 26, 30 retain mounting flange 36 and second component 14 when fastener assembly 10 is exposed to loads due to vibration, fastener-to-fastener contact, fastener assembly weight, and the like when multiple units of fastener assembly 10 are shipped. According to several embodiments, only one of first or second raised detents 26, 30 is present and used to retain the assembled position.

Figure 11:
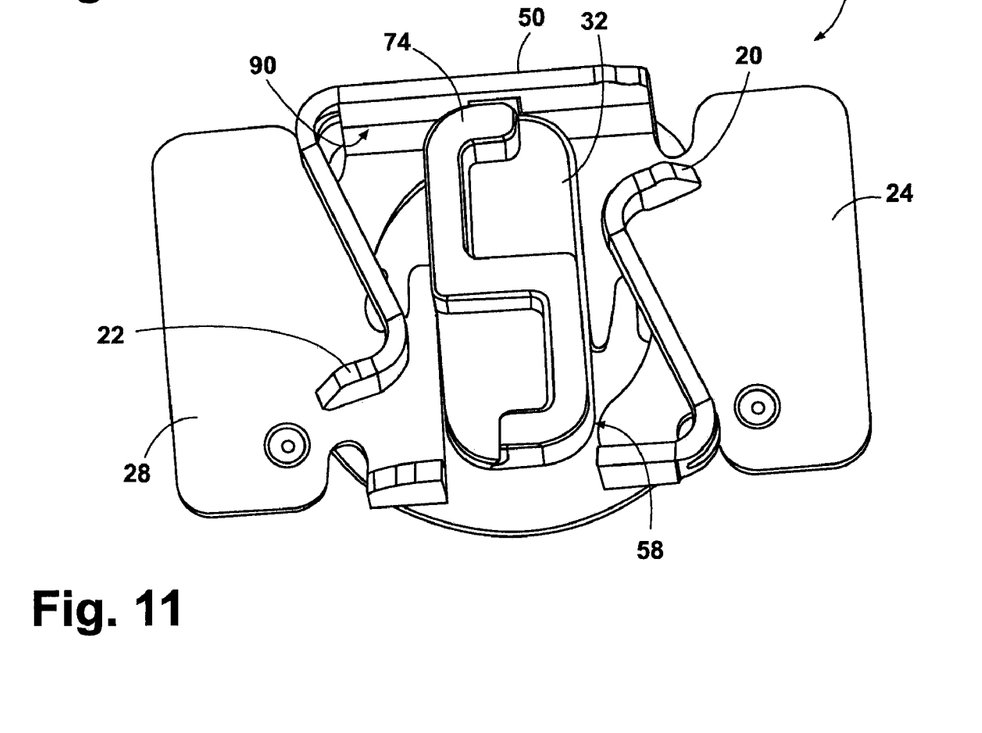
FIG. 11 is a bottom plan view of the fastener assembly of FIG. 10.

Referring to FIG. 11, to create fastener sub-assembly 88, engagement member 32 is slidably received within engagement member receiving slot 58 of first component 12 such that either first or second engagement wall 74 or 76 contacts an interior face 90 of support wall 50. The fastener sub-assembly 88 is not limited to the orientation of engagement member 32. Either first or second engagement wall 74 or 76 can be received in first component 12 and contact support wall 50 to establish a positive stop of engagement member 32. With engagement member 32 received as shown, each of first and second deflectable wings 20, 22 are maintained in their non-deflected positions and are not contacted by first or second engagement walls 74, 76.

Figure 12:
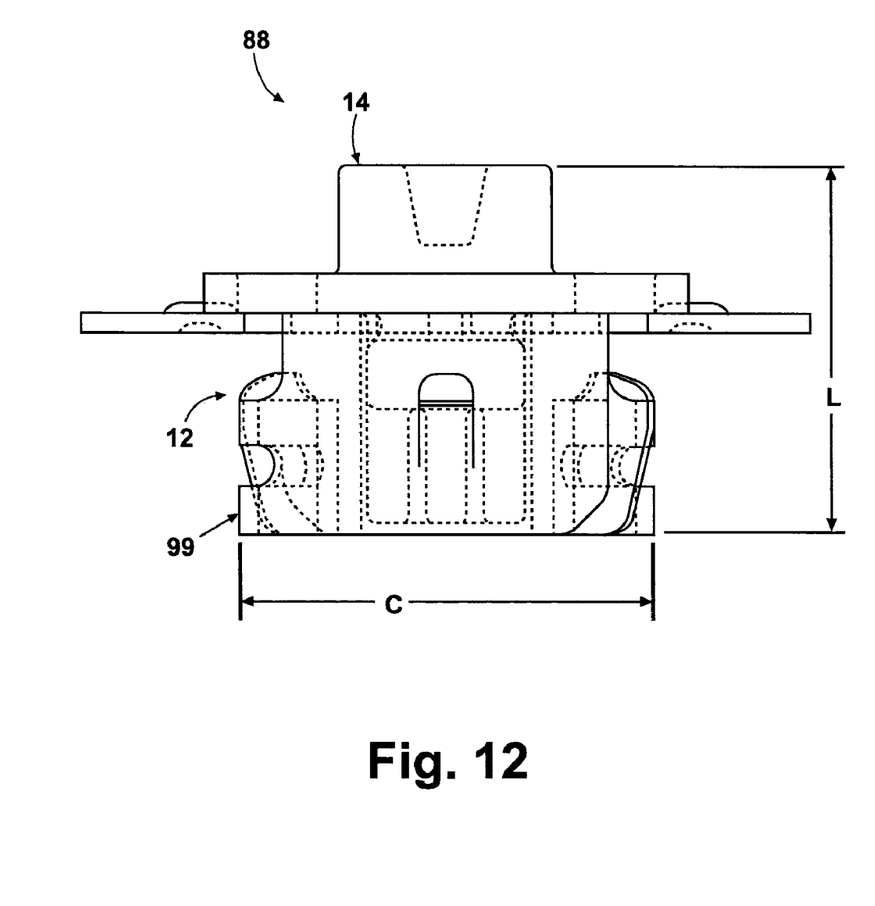
FIG. 12 is a front elevational view of the fastener assembly of FIG. 1.
Figure 13:
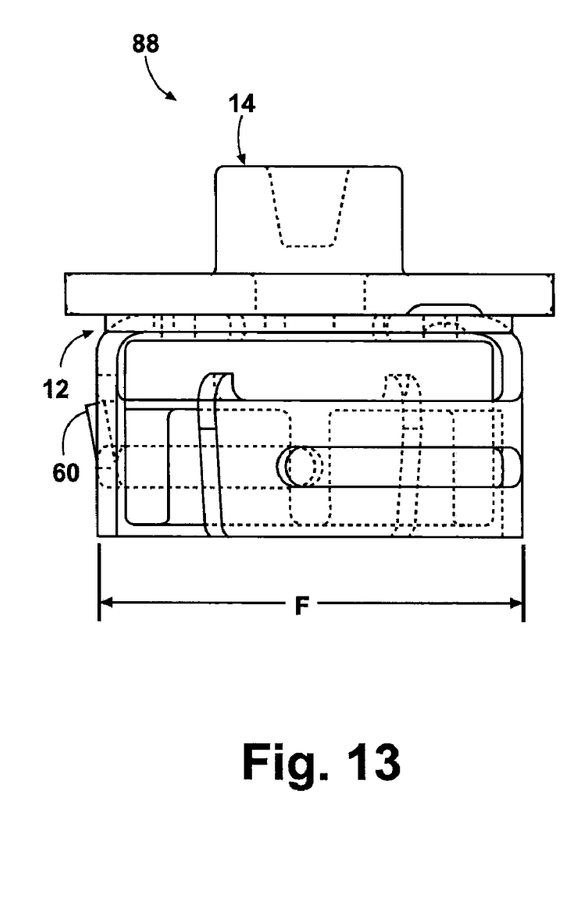
FIG. 13 is an end elevational view of the fastener assembly of FIG. 1.

Referring to both FIGS. 12 and 13, when first and second components 12, 14 are assembled to create sub-assembly 88, a sub-assembly height "L" is defined which according to several embodiments is approximately 13.7 mm. The insertion portion width "C" as well as the insertion portion length "F" is not affected by the assembly of first and second components 12, 14 into sub-assembly 88. The extending portion of tab 60 is not included in insertion portion length "F".

Referring to FIG. 14 and again to both FIGS. 12 and 13, a portion of fastener sub-assembly 88 can be inserted in a fastener receiving aperture 92 created in a panel 94 of a vehicle such as an automobile. Fastener receiving aperture 92 can include an inside radius corner 96 at each of the corners of the rectangular shaped aperture of fastener sub-assembly 88. Fastener receiving aperture 92 also includes an aperture width "M" and an aperture height "N". According to several embodiments, aperture width "M" and aperture height "N" can be equal dimensions, for example approximately 16.0 mm, or they can be different dimensions predetermined to allow sliding clearance with respect to insertion portion width "C" and insertion portion length "F" of fastener sub-assembly 88. Portions of fastener sub-assembly 88 can therefore be slidably received into fastener receiving aperture 92.

Figure 14:
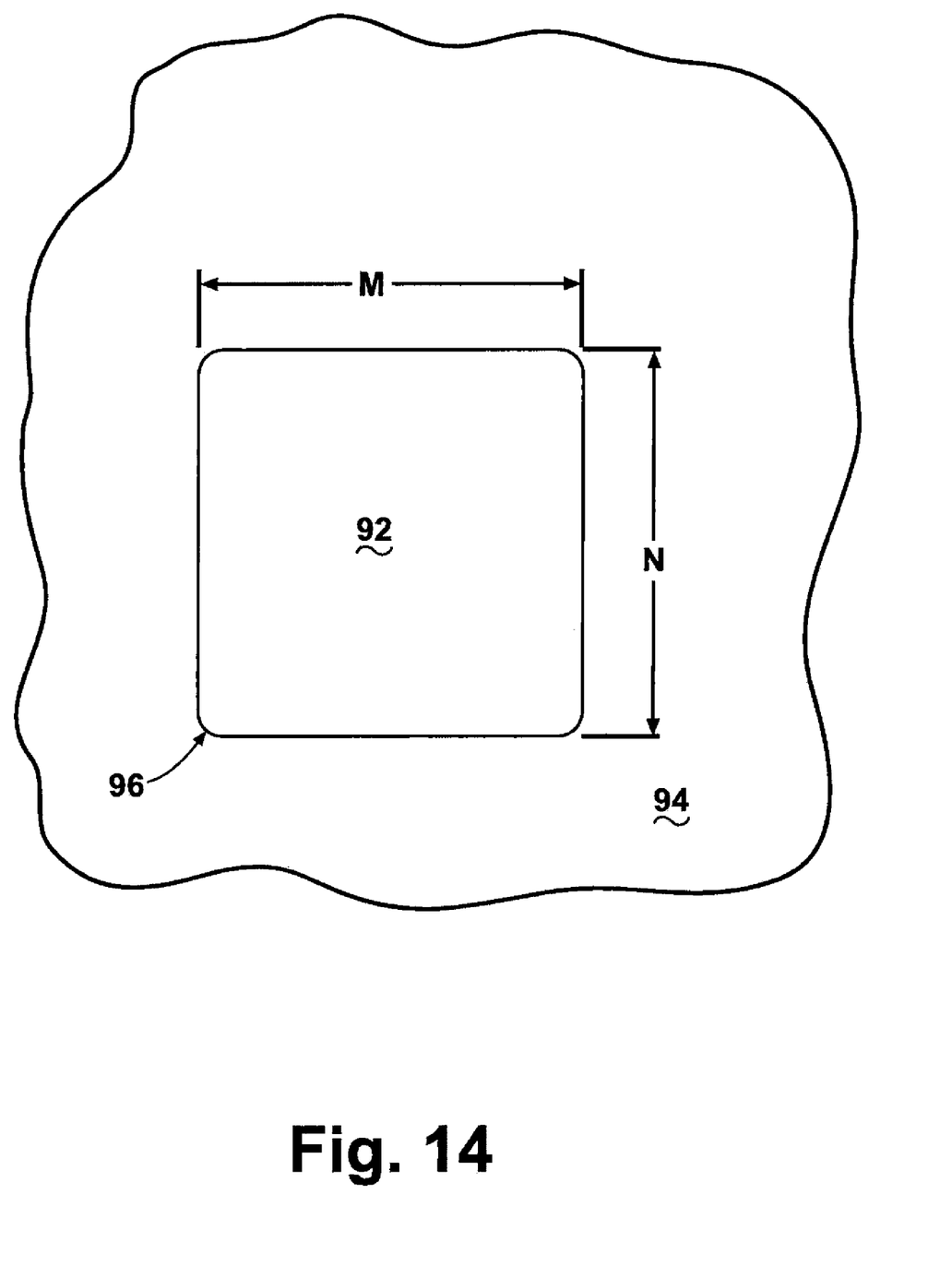
FIG. 14 is a top plan view of an aperture created through a body panel adapted to receive the fastener assembly of FIG. 1.

Referring to FIG. 15 and again to FIGS. 12-14, fastener assembly 10 can be used to connect an air bag assembly to a panel of an automobile vehicle. To accomplish this, an aperture (not shown) which is the same size or smaller than fastener receiving aperture 92 is created in an air bag 98. This aperture is smaller than fastener receiving aperture 92 to provide a friction fit for an insertion portion 99 of fastener sub-assembly 88 shown in FIG. 12. Insertion portion 99 includes engagement member 32 of second component 14 as well as first and second deflectable wings 20, 22 and support wall 50 of first component 12. Air bag 98 is sufficiently flexible to allow the material in the area around the aperture formed through the air bag 98 to deflect temporarily when the insertion portion 99 of fastener sub-assembly 88 is received therein. Insertion portion 99 is pushed into the receiving aperture of the air bag 98 until the first and second flange portions 24, 28 of first component 12 directly contact the air bag 98. The installation of fastener assembly 10 to the air bag 98 can be performed at an air bag manufacturer and the combined assembly of air bag 98 and fastener assembly 10 can then be shipped to the installer of the air bag assembly.

Figure 15:
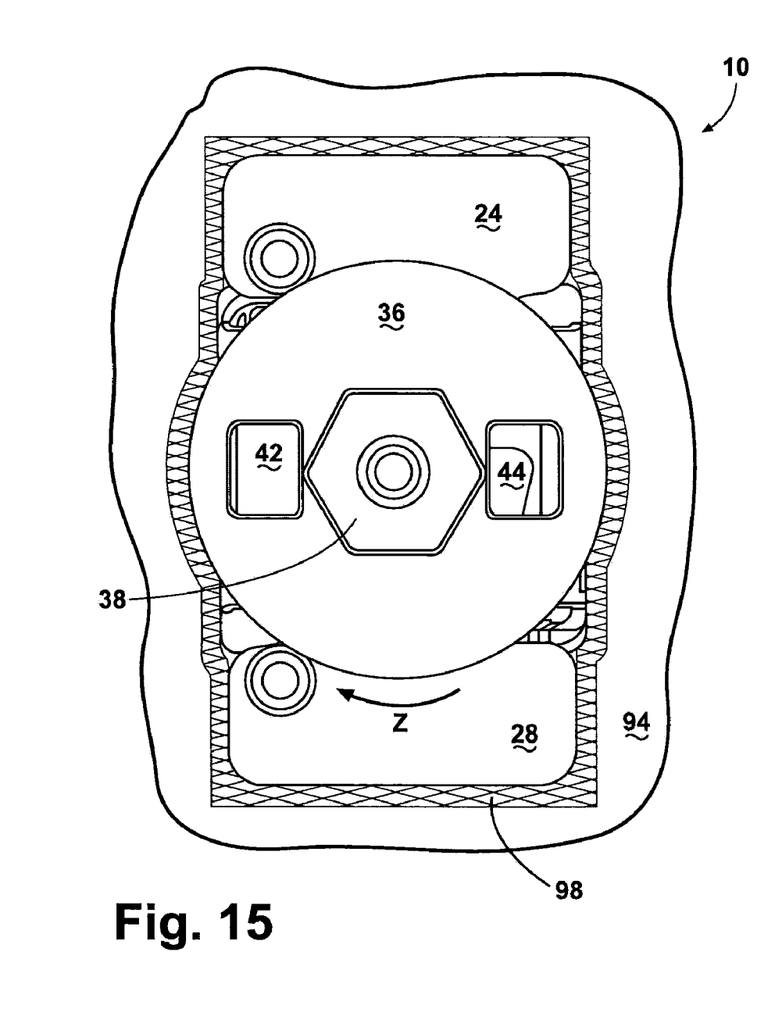
FIG. 15 is a top plan view of an assembly of the fastener assembly of FIG. 1 together with an air bag to the body panel of FIG. 14.

When the assembly of the fastener assembly 10 and the air bag 98 is installed into an automobile vehicle, insertion portion 99 is inserted into fastener receiving aperture 92 of panel 94 until the air bag 98 directly contacts panel 94 as shown in FIG. 15. Air bag 98 is only partially shown in FIG. 15 so that vehicle panel 94 is also visible. At this time, a tool such as a wrench or socket (not shown) is applied to drive member 38 and drive member 38 is rotated (together with second component 14) with respect to first component 12 in a clockwise rotation arc "Z" for approximately 90 degrees of rotation. This 90 degree rotation repositions first and second flange ports 42, 44 as shown.

Referring to FIG. 16 and again to FIG. 14, when second component 14 is rotated approximately 90 degrees, radius corner 85" of second engagement wall 76 initially contacts first deflectable wing 20 and second engagement wall 76 thereafter displaces first deflectable wing 20 in a first wing deflection direction "V1". During rotation, radius corner 85 of first engagement wall 74 initially contacts second deflectable wing 22 and first engagement wall 74 thereafter displaces second deflectable wing 22 in a second wing deflection direction "$W_2$" opposite to first wing deflection direction "$W_1$". An "extended position" of first and second components 12, 14 is thereby created having first and second deflectable wings 20, 22 both displaced outwardly (away from each other) from the assembled position of fastener assembly 10. A "completed assembly" 100 is created when in the extended position first and second deflectable wings 20, 22 extend over panel 94 and beyond the edges of fastener receiving aperture 92, allowing first and second deflectable wings 20, 22 to contact panel 94 preventing withdrawal of insertion portion 99 from fastener receiving aperture 92.

Figure 16:
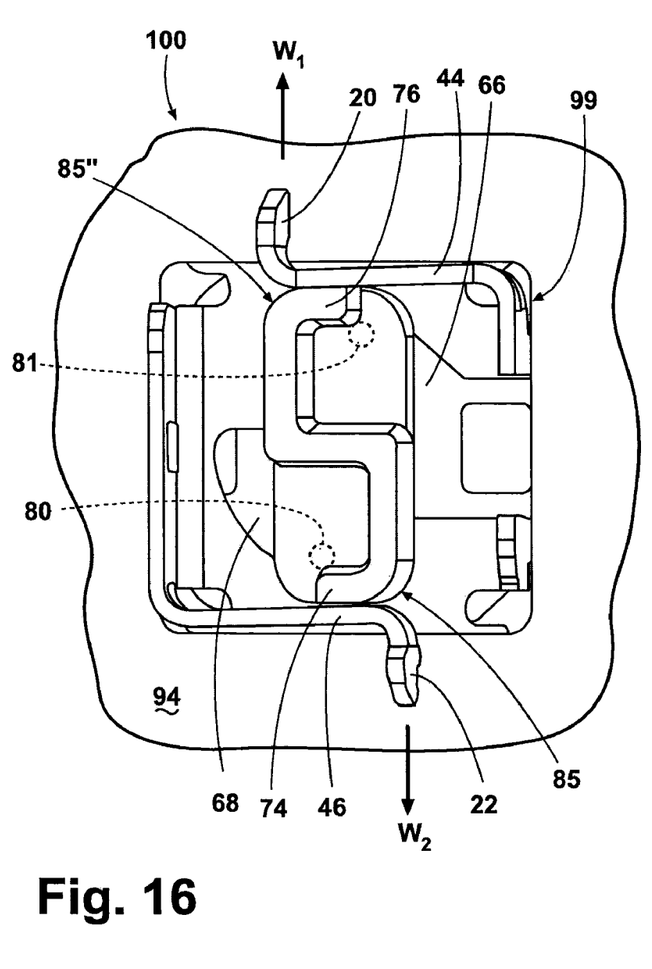
FIG. 16 is a bottom plan view of the assembly of FIG. 15 engaged into the body panel.

Referring to both FIGS. 15 and 16, it is noted that counter-clockwise rotation arc "Z" allows the radius corners 85, 85" of first and second engagement walls 74, 76 to initially contact the first and second flexible arms 44, 46. This rotation path smoothly transitions deflection of first and second deflectable wings 20, 22 and prevents contact between flat end faces of first and second engagement walls 74, 76 with first and second deflectable wings 20, 22 which could hinder rotation.

Figure 9:
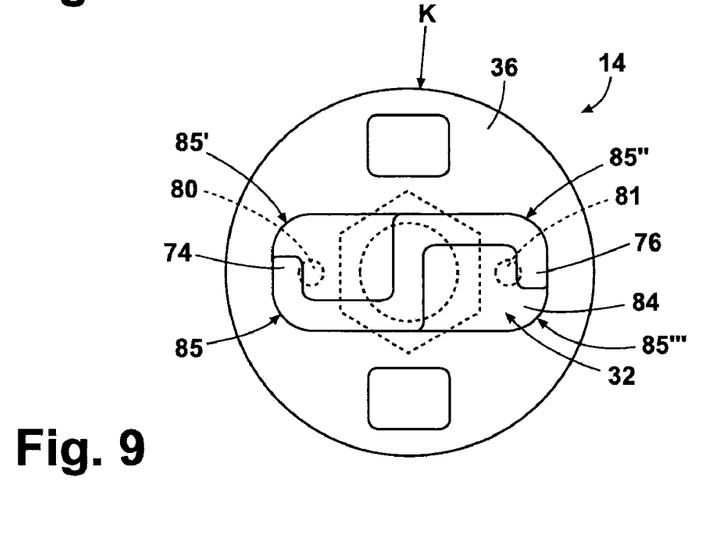
FIG. 9 is a top plan view of the second component of FIG. 6.

To assist with the rotation of second component 14 with respect to first component 12, and with further reference to FIGS. 8, 9, and 16, as second component 14 is rotated in the clockwise engagement direction "Z", first and second pins 80, 81 are received in the first and second arc-shaped slots 66, 68 of first component 12. First and second pins 80, 81 can contact walls 101, 101' of first and second arc-shaped slots 66, 68 during rotation of second component 14 to maintain a substantially circular shaped rotation path for second component 14. It is also noted first and second pins 80, 81 will contact side walls of engagement member receiving slot 58 before 90 degrees of rotation can occur for second component 14 if a clockwise rotation of second component 14 is attempted instead of using counterclockwise engagement direction "Z".

Figure 17:
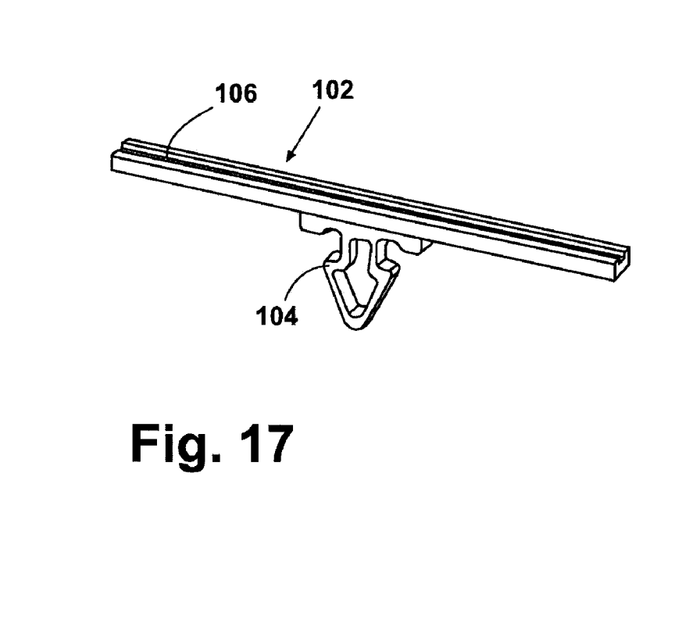
FIG. 17 is a front elevational perspective view of a clip member adapted for installation into the assembly of FIG. 15.
Figure 18:
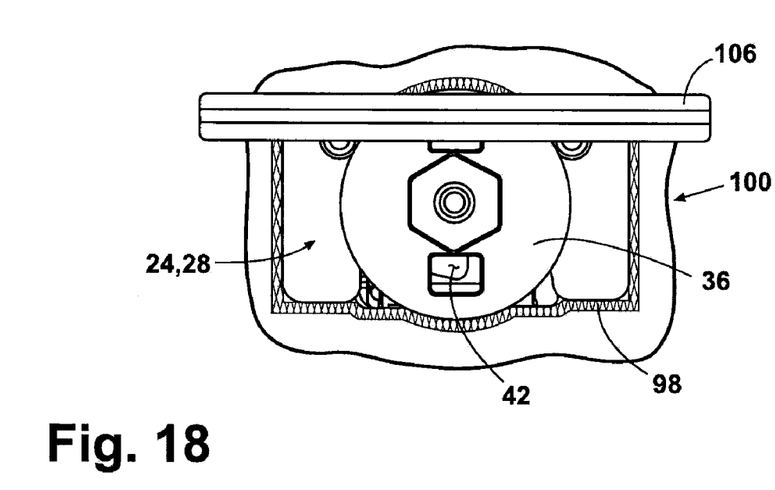
FIG. 18 is a top plan view of the assembly of FIG. 15 modified to add the clip member of FIG. 17.
Figure 19:
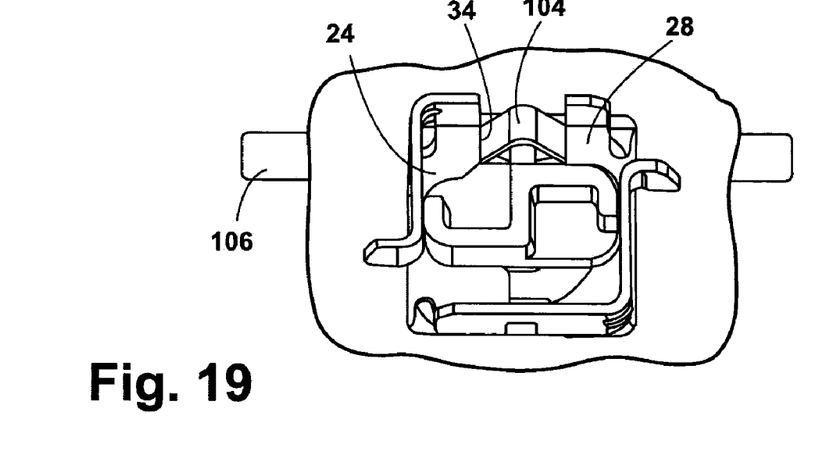
FIG. 19 is a bottom plan view of the assembly of FIG. 19.

Referring to FIGS. 17-19, an optional visual indicator of the completed assembly 100 can also be provided by installation of separate component independent of fastener assembly 10 such as a clip member 102 following rotation of second component 14 with respect to first component 12. Clip member 102 includes an arrow-shaped deflectable member 104 extending transversely from a longitudinal member 106. Longitudinal member 106 can also provide the additional service of a support member for a wiring assembly for example. As shown in FIGS. 18 and 19, the arrow-shaped deflectable member 104 is inserted into one of the flange ports, in this example second flange port 44 (not clearly visible in these views) until arrow-shaped deflectable member 104 extends through a portion of cavity 34. A biasing force is created by arrow-shaped deflectable member 104 as opposed walls of arrow-shaped deflectable member 104 compress toward each other and then snap outwardly away from each other into the position shown in FIG. 19. Following insertion through cavity 34, the biasing force of arrow-shaped deflectable member 104 locks clip member 102 into position and as shown in FIG. 18 provides a visual indication that completed assembly 100 is properly positioned. Installation of arrow-shaped deflectable member 104 also provides further resistance to rotation of second component 14 with respect to first component 12. Clip member 102 does not form a component member of fastener assembly 10, but can be used as noted above as an optional visual indication of a completed assembly 100.

Fastener assemblies 10 of the present disclosure offer several advantages. By limiting the required rotation of second component 14 during installation of fastener assembly 10 to approximately 90 degrees, the time to install fastener assembly 10 is reduced compared to previously known fastener assemblies required for air bag assemblies. By using the 90 degree rotation of the second component 14 to extend opposed deflectable wings 20, 22, fastener assembly 10 can be permanently positioned, preventing displacement of fastener assembly 10 if the air bag 98 deploys. Fastener assembly 10 also includes first and second raised detents 26, 30 which can be rounded to allow the first and second components 12, 14 to be sub-assembled and separately shipped to the manufacturer of the air bag assembly. First and second raised detents 26, 30 retain the second component 14 in the first component 12 during shipment. The use of flange ports in the mounting flange 36 of the second component 14 also provides for installation of a visual confirmation device once the completed assembly 100 of fastener assembly 10 to the air bag 98 and the vehicle panel 94 is completed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A fastener assembly, comprising:
   a first component having opposed first and second legs defining a cavity therebetween, first and second deflectable wings each homogenously connected to and freely extending from one of the first and second legs, the first deflectable wing extending oppositely with respect to the second deflectable wing, and co-planar first and second flange portions each homogenously connected to one of the first and second legs, both oriented substantially transverse to the first and second legs, separated from each other defining an engagement member receiving slot therebetween, and each including an arc-shaped slot opening into the engagement member receiving slot;

a second component having:
an engagement member adapted to be slidably received in the cavity of the first component; and
a mounting flange having the engagement member homogenously connected thereto, the mounting flange extending substantially transverse to the engagement member; and an assembled position of the first and second components having the engagement member slidably disposed within the cavity, and an extended position of the first and second components having the second component rotated approximately 90 degrees from the assembled position wherein the engagement member displaces both the first and second deflectable wings away from each other.

2. The fastener assembly of claim 1, further comprising first and second pins extending between the mounting flange and the engagement member, the first and second pins each received in one the first and second arc-shaped slots during rotation of the second component, wherein contact between the first and second pins with a wall of the first and second arc-shaped slots operates to maintain a substantially circular rotation of the second component.

3. The fastener assembly of claim 1, further including first and second raised detents each created on one of the first and second flange portions, the first and second raised detents operating to contact a perimeter wall of the mounting flange to resist withdrawal of the second component from the first component when in the assembled position.

4. The fastener assembly of claim 1, further including a drive member homogenously connected to the mounting flange, the drive member and the engagement member extending from opposite sides of the mounting flange.

5. The fastener assembly of claim 4, wherein the drive member includes a plurality of tool engagement faces adapted for releasable engagement by a drive tool to rotate the second component with respect to the first component.

6. A fastener assembly, comprising:
a first component having opposed first and second legs defining a cavity therebetween, first and second deflectable wings each homogenously connected to and freely extending from one of the first and second legs, the first deflectable wing extending oppositely with respect to the second deflectable wing, and co-planar first and second flange portions each homogenously connected to one of the first and second legs and both oriented substantially transverse to the first and second legs, and separated from each other defining an engagement member receiving slot therebetween;
a second component having:
an engagement member adapted to be slidably received in the cavity of the first component; and
a mounting flange having the engagement member homogenously connected thereto, the mounting flange extending substantially transverse to the engagement member;

an assembled position of the first and second components having the engagement member slidably disposed within the cavity, and an extended position of the first and second components having the second component rotated approximately 90 degrees from the assembled position wherein the engagement member displaces both the first and second deflectable wings away from each other; and a neck region connecting the mounting flange to the engagement member, the neck region being narrower than the engagement member and adapted to slidably engage opposing edges of the first and second flange portions when the neck region is received in the engagement member receiving slot.

7. A fastener assembly, comprising:
a metal first component having two homogenously connected flange portions separated from each other defining an engagement member receiving slot therebetween, the flange portions each having one of a first and a second leg separated from each other defining a cavity therebetween, a first arm oriented transverse to the first leg and having a first deflectable wing extending freely from the first arm, and a second arm oriented transverse to the second leg and having a second deflectable wing extending freely from the second arm;
a polymeric second component having:
an engagement member adapted to be received in the cavity of the first component without contacting the first or second deflectable wings defining an assembled position of the first and second components; and
a mounting flange having the engagement member homogenously connected thereto, the mounting flange extending substantially transverse to the engagement member and parallel to the first and second legs; and
an extended position of the first and second components having the second component rotated approximately 90 degrees from the assembled position, the engagement member operating in the extended position to displace both the first and second deflectable wings away from each other.

8. The fastener assembly of claim 7, wherein the first component includes a support wall connected to and oriented transverse to the flange portions, the first arm homogenously connected to the support wall.

9. The fastener assembly of claim 8, further including a fixed arm extending transversely from a first one of the flange portions and substantially parallel to the support wall, the second arm homogenously connected to the fixed arm.

10. The fastener assembly of claim 8, further including a tab extending outwardly from the support wall having a tab surface oriented facing a contact face of the flange portions.

11. The fastener assembly of claim 7, wherein each of the first and second arms includes an elongated slot adapted to control a biasing force created by bending each of the first and second arms.

12. The fastener assembly of claim 7, wherein the second component further includes a neck region connecting the mounting flange to the engagement member, the neck region being narrower than the engagement member and adapted to slidably engage opposing edges of the flange portions when the neck region is received in the engagement member receiving slot.

13. A fastener assembly adapted to connect an air bag to a vehicle panel, comprising:
a first component having a support wall connected to first and second coplanar flange portions, a fixed arm extending parallel to the support wall from one of the flange portions, opposed first and second legs defining a cavity therebetween, the first leg connected to the support wall and the second leg connected to the fixed arm, and first and second deflectable wings each homogenously connected to and freely extending from one of the first and second legs;

a second component having:
- an engagement member adapted to be slidably received in the cavity of the first component; and
- a mounting flange having the engagement member homogenously connected thereto, the mounting flange extending substantially transverse to the engagement member;

wherein the support wall, the fixed arm, the first and second legs, and the first and second deflectable wings define an insertion portion adapted to be slidably received in both an aperture of an air bag and an aperture of a vehicle panel.

14. The fastener assembly of claim 13, comprising at least one raised detent created on one of the first and second flange portions wherein the engagement member slidably disposed within the cavity without contact between the engagement member and the first and second deflectable wings and the mounting flange in contact with the at least one raised detent define an assembled position of the first and second components.

15. The fastener assembly of claim 14, further comprising first and second opposed engagement walls of the engagement portion, wherein in an extended position of the first and second components the second component is rotated approximately 90 degrees from the assembled position such that the first and second engagement walls of the engagement member each displace one of the first and second deflectable wings in directions opposite to each other and extending beyond the aperture and over the body panel, the first and second deflectable wings thereafter precluding withdrawal of the insertion portion from the aperture of the vehicle panel.

16. The fastener assembly of claim 14, wherein the at least one raised detent comprises first and second raised detents each created on one of the first and second flange portions, the first and second raised detents both contacting a perimeter wall of the mounting flange operate to resist removal of the second component from the first component.

17. The fastener assembly of claim 13, further including a tab extending outwardly from the support wall having a tab surface oriented facing a contact face of the first and second flange portions, wherein the insertion portion is inserted into the aperture of the air bag and the air bag is positioned between the tab surface and the contact face of the first and second flange portions in a temporary assembly.

18. The fastener assembly of claim 13, wherein the first and second flange portions are separated from each other defining an engagement member receiving slot therebetween, and wherein each of the first and second flange portions include an arc-shaped slot opening into the engagement member receiving slot.

19. The fastener assembly of claim 18, further comprising first and second pins extending between the mounting flange and the engagement member, the first and second pins each received in one of the first and second arc-shaped slots during rotation of the second component, wherein contact between the first and second pins with a wall of the first and second arc-shaped slots operates to maintain a substantially circular rotation of the second component.

20. The fastener assembly of claim 13, further comprising:
- an engagement member receiving slot defined between the first and second flange portions;
- first and second flange ports created through the mounting flange; and
- a clip member having an arrow-shaped deflectable member, the arrow-shaped deflectable member received in one of the first and second flange ports when co-aligned with a portion of the engagement member receiving slot, the clip member operable to visually indicate a completed assembly of the fastener assembly to the air bag and the vehicle panel.

* * * * *